United States Patent
Dorrestein et al.

(10) Patent No.: US 9,709,758 B2
(45) Date of Patent: Jul. 18, 2017

(54) OPTICAL ASSEMBLY WITH PASSIVE ALIGNMENT

(71) Applicant: Tyco Electronics Nederland B.V., Ar's-Hertogenbosch (NL)

(72) Inventors: Alexander Dorrestein, Helmond (NL); Jeroen Duis, Didam (NL); Jacobus Tuin, Best (NL)

(73) Assignee: TE Connectivity Nederland B.V. (NL)

( * ) Notice: Subject to any disclaimer, the term of this patent is extended or adjusted under 35 U.S.C. 154(b) by 0 days.

(21) Appl. No.: 14/571,663

(22) Filed: Dec. 16, 2014

(65) Prior Publication Data
US 2016/0170155 A1   Jun. 16, 2016

(51) Int. Cl.
*G02B 6/36* (2006.01)
*G02B 6/42* (2006.01)

(52) U.S. Cl.
CPC ............. *G02B 6/423* (2013.01); *G02B 6/42* (2013.01); *G02B 6/4243* (2013.01); *G02B 6/4245* (2013.01); *G02B 6/4231* (2013.01)

(58) Field of Classification Search
CPC .. G02B 6/4245; G02B 6/4243; G02B 6/4228; G02B 6/423
See application file for complete search history.

(56) References Cited

U.S. PATENT DOCUMENTS

| | | | |
|---|---|---|---|
| 5,905,831 A | 5/1999 | Boudreau et al. | |
| 6,456,766 B1 * | 9/2002 | Shaw | G02B 6/30 385/47 |
| 2002/0031308 A1 * | 3/2002 | Uekawa | G02B 6/32 385/52 |
| 2002/0090013 A1 | 7/2002 | Murry et al. | |
| 2003/0137022 A1 * | 7/2003 | Dautartas | G02B 6/3636 257/432 |
| 2010/0074573 A1 * | 3/2010 | Yoshikawa | G02B 6/423 385/14 |

FOREIGN PATENT DOCUMENTS

| | | |
|---|---|---|
| JP | 2004 096091 A | 3/2004 |
| JP | 2014 017451 A | 1/2014 |

OTHER PUBLICATIONS

International Search Report and Written Opinion for International Application No. PCT/IB2015/059700, mailed Apr. 8, 2016.

* cited by examiner

*Primary Examiner* — Chad Smith

(57) ABSTRACT

An optical assembly having x, y and z axes and comprising: (a) a first substrate having a planar surface, a first wall adjacent and substantially perpendicular to the planar surface, a first register surface adjacent the first wall, at least one foundation to receive an optical element having a first optical axis at least partially along the z axis; (b) an opto-electrical device (OED) having a top surface, an active area on the top surface having a second optical axis normal to the top surface, and a first alignment element defined on the top surface, the OED mounted to the first wall such that the first alignment element contacts the first register surface to position the OED on the first substrate along at least one of the x or y axes with the second optical axis parallel to the planar surface.

17 Claims, 4 Drawing Sheets

OPTICAL ASSEMBLY WITH PASSIVE ALIGNMENT

FIELD OF INVENTION

The present invention relates generally to optical subassemblies, and, more particularly to an optical subassembly containing surface emitting opto-electric devices in which the optical axis of the device is parallel with the substrate on which it is mounted.

BACKGROUND

Optical systems and devices generally comprise optical assemblies (OAs) of opto-electric devices (OEDs) integrated with optical conduits, such as fibers and waveguides, on a substrate or platform. Critical to the effectiveness of these OAs is the alignment of the OED with this optical conduit. There are generally two alignment approaches for aligning OEDs—active and passive. In passive alignment, registration or alignment features are typically fabricated directly on the components as well as on the platform to which the components are to be mounted. The components are then positioned on the platform using the alignment features and affixed in place. In active alignment, the OEDs are placed on the platform, but before being affixed thereto, an optical signal is transmitted through the components while they are manipulated to provide optimum optical performance. Once optimum performance is achieved, the components are affixed to the platform. Although active alignment tends to be more precise than passive alignment, passive alignment facilitates high-speed, high-volume automated manufacturing and, thus, is preferred.

One of the preferred set of OEDs in the optical communication technology is the surface emitting and detecting device. However, devices such as Vertical Cavity Surface Emitting Lasers (VCSELS) and photo detectors (such as PIN photodiodes) that have the photosensitive surface to receive or emit light on the top surface tend to be difficult to align with an optical fiber. In general, to effect the alignment between the device and the fiber using a silicon optical bench, the device must be on a different plane than the fiber, with the light being communicated therebetween by a reflective surface. While such technology has its merits in allowing passive alignment to some extent, it typically requires that the device be actively aligned into position so that light is properly reflected by the reflective surface. Furthermore, the use of a reflective surface decreases coupling efficiency due to intrinsic losses incurred at each optical surface through dispersive effects.

Accordingly, there is a need for a more efficient system to optically couple fiber and the device. One such system is disclosed in U.S. Pat. No. 5,905,831, which is hereby incorporated by reference. The '831 patent discloses a system in which the surface emitting OED is mounted on a passive alignment member, which in turn is mounted to a substrate containing a fiber, thereby passively aligning the OED with a fiber held in the substrate.

Although such a system provides for passive alignment and manufacturability, Applicants have identified the need to further simplify the system, improve optical performance (reduce insertion loss) and to further enhance manufacturability. The present invention fulfils these needs among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention enables low optical insertion loss by mounting an OED with an active top surface (for instance VCSEL or PIN diode), perpendicular to a substrate, such that the optical axis of the OED is parallel to the substrate. This allows the OED to be directly coupled to either optical conduit or other optical structures on the substrate. No additional elements are needed to change the direction of the light, and thus reducing possible causes for insertion loss.

To get good coupling, accurate alignment of the optical components is necessary. This is not straightforward when placing the OED perpendicular to the substrate. The edges of the OED die are created in the dicing process (for instance with a dicing saw), and do not typically have the required accuracy with respect to the active optical area of the OED. Thus, mounting the OED on its edges is generally not a viable option.

The applicants recognize that, rather than relying on the edges of the OED for alignment, the non-functional area of OED may be etched or layered through standard photolithography techniques to create a very precise mechanical feature (for instance an edge, cylinder, square, triangle, etc.), which can be used for passive alignment. This is done while the OED die is still in wafer form, using processes common in the chip manufacturing industry, which are capable of achieving very high accuracies. In this way, the position of the functional optical area is well defined with respect to the mechanical alignment features. In one embodiment, the functional area and the alignment element(s) are defined on the surface of the OED using the same photolithography process to reduce tolerance buildup. The OED can then be placed sideways in a receiving part in which a reference or register surface for alignment is present (for instance a V-groove etched in silicon).

Accordingly, one aspect of the invention is an optical assembly comprising an OED mounted perpendicular to the substrate and aligned along one or more axes by passive alignment. In one embodiment, an optical assembly having x, y and z axes and comprising (a) a first substrate having a planar surface, a first wall adjacent and perpendicular to the planar surface, a first register surface adjacent the first wall, at least one foundation to receive an optical element having a first optical axis at least partially along the z axis; and (b) an opto-electrical device (OED) having a top surface, an active area on the top surface having a second optical axis normal to the top surface, and a first alignment element defined on the top surface, the OED mounted to the first wall such that the first alignment element contacts the first register surface to position the OED on the first substrate along at least one of the x or y axes with the second optical axis parallel to the planar surface.

DETAILED DESCRIPTION

Figure 1:
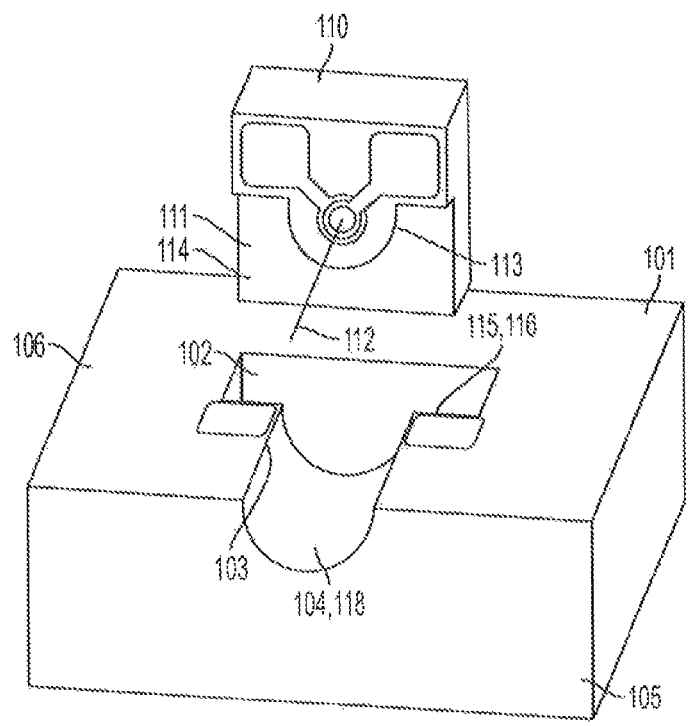
FIG. 1 shows one embodiment of the optical assembly of the present invention with the optoelectric device (OED) disassociated from the substrate.
Figure 2:
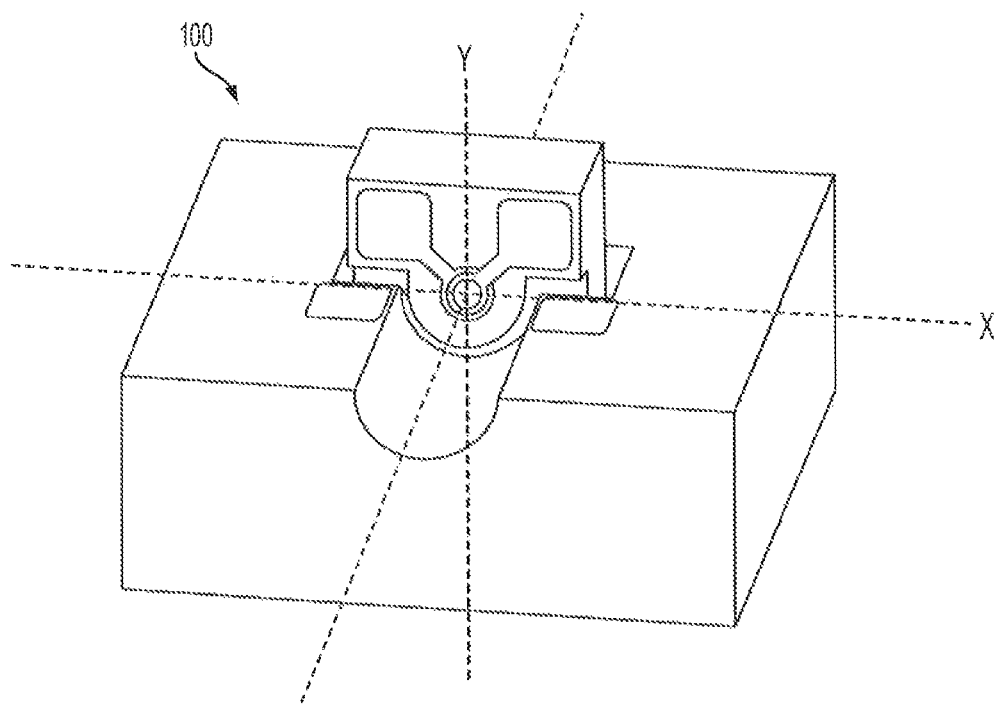
FIG. 2 shows the optical assembly of FIG. 1 with the OED in place.
Figure 3:
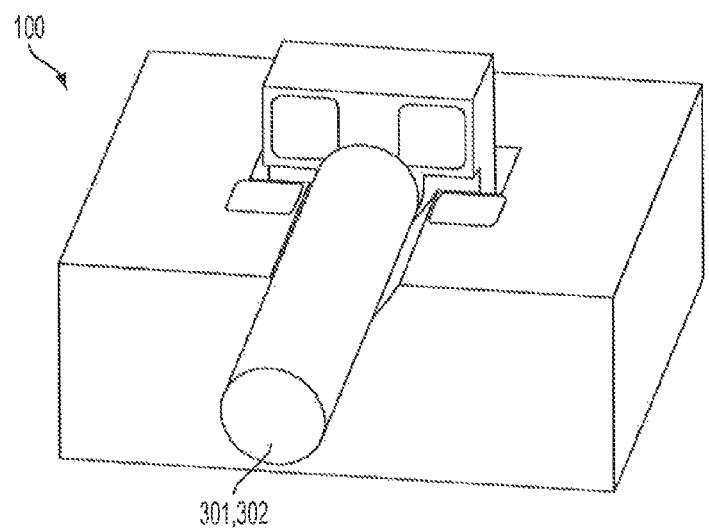
FIG. 3 shows the optical assembly of FIG. 1 with a fiber disposed thereon.

Referring to FIGS. 1-3, one embodiment of the optical assembly (OA) 100 of the present invention is shown. The OA is described herein in relation to x, y and z axes, although it should be understood that such an orientation is for illustration purposes only and should not be interpreted as limiting the claimed invention. The OA 100 comprises a first substrate 101 having a planar surface 106. The first substrate also comprises a first wall 116, which is perpendicular to the planar surface, and which, in this embodiment, defines a portion of cavity 102 in the planar surface. The first substrate 101 also comprises a first register surface 103 adjacent the first wall, and a foundation 104 for receiving an optical element 301, such as an optical conduit 302 (see FIG. 3), which extends at least partially along the z axis from the first wall 116 to an edge 105 of the substrate. The OA 100 also comprises an opto-electrical device (OED) 110 having a top surface 111 and an optical axis 112 normal to the top surface. The OED 110 comprises a first alignment element 113 defined on or adjacent the top surface. The OED 110 is configured to mount against the first wall 116 such that the first alignment element contacts the first register surface to position the OED on the first substrate along at least one of the x or y axes, and to position the optical axis 112 parallel to the planar surface 106 (as shown in FIGS. 2 and 3).

Embodiments of the alignment element and register surfaces of the OA of the present invention vary. For example, in the embodiment shown in FIGS. 1-3, the first alignment element 113 is shaped to provide alignment along multiple axes. Specifically, the alignment element 113 in this embodiment is shaped like a portion of a fiber (half cylinder) to seat in a fiber groove 118 in the same way as the fiber would seat in the groove. More specifically, the foundation 104 in this embodiment is the groove 118 to receive a fiber 302 as shown in FIG. 3. The first register surface 103 comprises a portion of the groove adjacent the first wall 116. The optical conduit 302, which in this embodiment is a fiber 302, has a certain cross-sectional shape—i.e. a curved profile with a particular radius. The alignment element 113 has the same curvature as that of the fiber 302. Because the fiber and the alignment element have the same curved shape, they both seat in the groove 118 in the same way. It is well known that a groove, such as a V-groove, can be precisely etched in a substrate such that, when a fiber (which has a precise outer diameter) is disposed in the groove, the fiber will be aligned in both the x and y axes on the substrate. Accordingly, in the embodiment shown in FIG. 1, the alignment element 113 is positioned in the groove along the x and y axes essentially the same as the optical fiber 302. In other words, the OED and fiber align in the same way in the V-groove of the substrate. This way, only the accuracy of the OED and the fiber are of interest for the alignment, while the accuracy (position and angle) of the V-groove will not influence the alignment of the OED and the fiber with respect to each other. As such, no strict dimensional requirements are needed for the receiving part, potentially lowering the cost of manufacturing, and opening possibilities to use other materials and processes to manufacture such a part.

Figure 4:
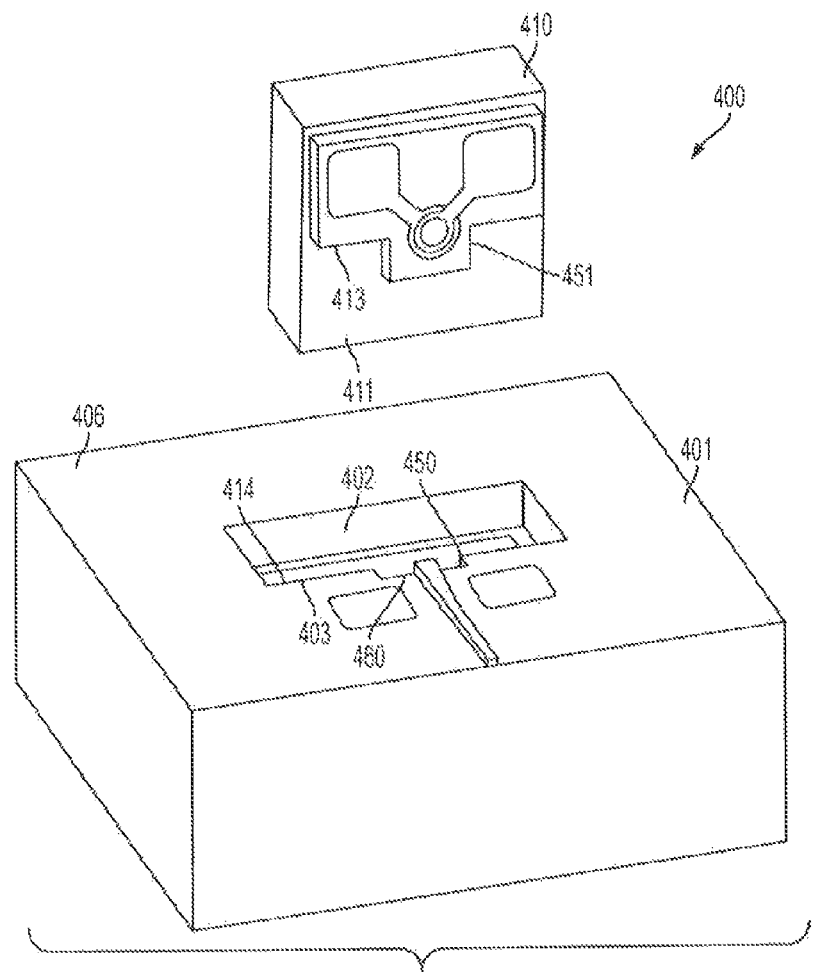
FIG. 4 shows an alternative embodiment of the optical assembly of the present invention with the OED disassociated from the substrate.
Figure 5:
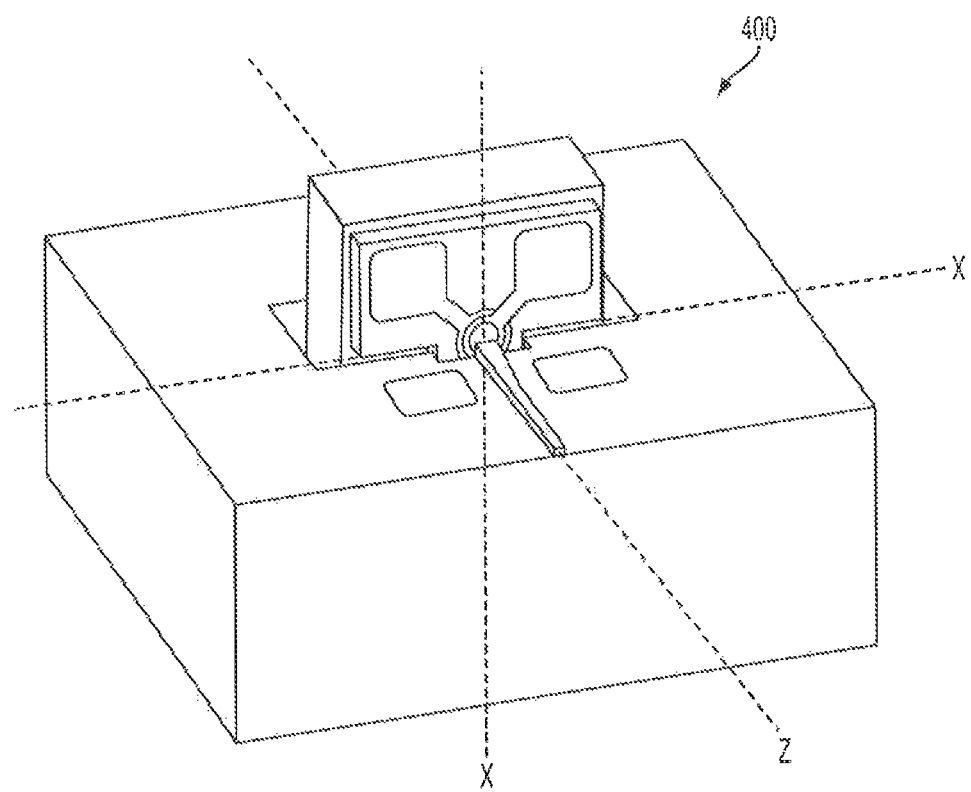
FIG. 5 shows the optical assembly of FIG. 4 with the OED integrated with the substrate.

In another embodiment, one or more simple alignment elements are used such that each element positions the OED along a particular axis. These alignment elements may comprise just a simple surface or edge that contacts a corresponding register surface. For example, a 'taper on chip' configuration may be used. Specifically, referring to the OA 400 shown in FIGS. 4 and 5, the OED 410 comprises a top surface 411 and a first alignment element 413, which is an edge/wall running along the x axis, and a second alignment element 451, which is an edge/wall running along the y axis. The first substrate 401 has corresponding register surfaces. Specifically, in this embodiment, the first substrate 401 comprises a cavity 402, similar to cavity 102 shown in FIG. 1, and defines multiple register surfaces 403, 450. The first register surface 403 is a portion of the planar surface 406 adjacent the cavity, and runs along the x axis. In this case, the first register surface is chosen for practical reasons to coincide with the planar surface of the substrate. Although the first register surface is depicted in FIG. 4 as being part of the planar surface 406, it should be understood that the first register surface can be coincident with the planar surface or parallel to it. For example, the register surface may be etched into or deposited on the planar surface and still provide the same y axis alignment discussed below. The second register surface 450 is an edge/wall defined in the first wall 414 of the cavity 402 and runs along the y axis Like the first register surface, this configuration may vary. The first alignment element 413 and the first register surface 403 cooperate to position the OED 410 along the y axis as shown in FIG. 5, while the second alignment element 451 and the second register surface 450 cooperate to align the OED 410 along the x-axis. In another embodiment, only the y axis alignment features are used, and the x axis alignment is performed actively during pick and place assembly. A significant reduction in manufacturing time and costs can be realized if passive alignment can be used to achieve acceptable alignment along two axes or even one so that active alignment is necessary for only the remaining axes or for fine tuning.

There are also various embodiments of the alignment elements and reference surfaces to position the OED along the z axis. For example, in one embodiment, the OED 110 comprises an alignment element 114, which is a portion of the top surface 111 and the substrate comprises a register surface 115 which is a portion of the first wall 116 of the cavity 102. It should be understood that, although the alignment element 114 and register surface 115 are depicted as portions of larger planar surfaces in FIGS. 1-3, they may be adjacent the planar surface, and may be, for example, etched into or protruding from their respective planar surfaces. The alignment element 114 and the register surface 115 cooperate to position the OED along the z axis when the OED is urged forward in the cavity 102.

Figure 6:
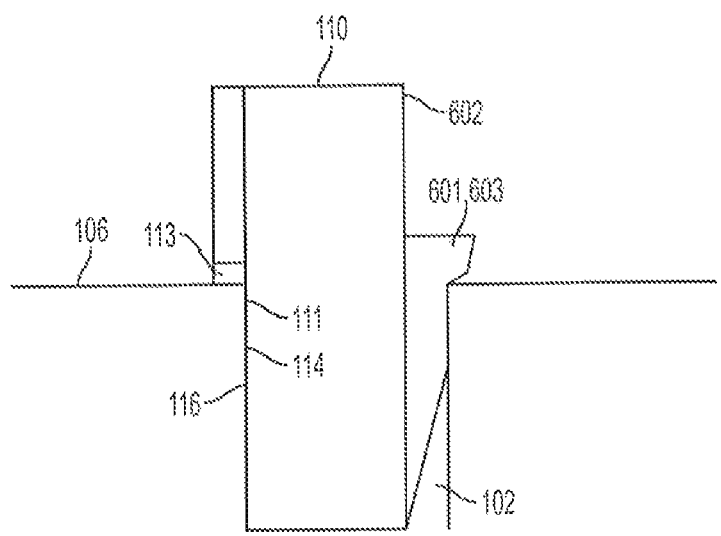
FIG. 6 shows a schematic of a side view of the optical assembly of FIG. 1 with an urging member urging the OED forward in the substrate.

Different approaches may be used to urge the OED forward in the cavity 102. For example, in one embodiment, the cavity 102 is configured to receive the OED 110 snugly such that the alignment element 114 urges against the front wall 116 of the cavity in which the foundation is defined. In an other embodiment, the cavity is configured to receive the OED with tolerance, and at least one an urging member 601 on the opposite side 602 of the top surface 111 is used to urge the alignment element 114 against the wall. In one embodiment, the urging member comprises a compliant material. In another embodiment, the urging member is wedge-like as depicted in FIG. 6. In another embodiment, the urging member is both wedge-like and compliant. In still another embodiment, the OED is held against the front wall while an adhesive between the OED and first wall cures to permanently hold the OED in place. Still other approaches for urging the OED against the front wall will be known to those of skill in the art in light of this disclosure.

Still other alignment elements and reference surface configurations for aligning the OED along the x, y, and z axes will be known to one of skill in the art in light of this disclosure. For example, whether the register surface receives the alignment element or whether the alignment element receives the register surface is immaterial unless otherwise noted in the specification. Likewise, either the register surface or the alignment element may be a plain surface, edge or a shaped protrusion/cavity. It should be also understood that multiple register surfaces or alignment elements may be used to align the OED with respect to the x, y, and z axes of the OA, or the alignment along two or more of the axes may be accomplished by a single corresponding set of register surface/alignment element. It should be also understood that the various alignment element/register surface configurations described herein can be mixed and matched in any combination based on the needs of the application which will be apparent to one of skill in the art in light of this disclosure.

Although FIGS. 1 and 4 depict the OED being disposed in a cavity within a substrate, it should be understood that the OED need not be disposed in a cavity, but, in another embodiment, may be adhered to the first wall which is defined on the side of the substrate. More specifically, it may be beneficial in some applications, to avoid the preparation of a cavity, and instead, secure the OED to the side or edge of the substrate using the alignment elements and registration surfaces as described above. Such an embodiment has the advantage of avoiding the need to create or trench a cavity in the substrate.

The OED may be any electrical device that sources, detects and/or controls light through an active top (or bottom) surface, and includes, for example, a vertical cavity surface emitting laser (VCSEL), photodiode, and photonics processor.

The optical element to which the OED optically couples can be any known or later-developed component that can be optically coupled directly to an OED. For example, in one embodiment, the optical element is an optical conduit. As used herein, the term "optical conduit" refers to any know medium for facilitating the propagation of optical signal in a certain direction. Common optical conduits include, for example, optical fibers and planar optical waveguides. Such optical conduits typically, although not necessarily, comprise a core and a cladding around the core to facilitate the light propagation down the optical conduit.

In another embodiment, the optical element is another OED for sourcing, detecting and/or controlling light (e.g. photonics processor, such as, a CMOS photonic processor, for receiving optical signals, processing the signals and transmitting responsive signals, electro-optical memory, electro-optical random-access memory (EO-RAM) or electro-optical dynamic random-access memory (EO-DRAM), and electro-optical logic chips for managing optical memory (EO-logic chips), lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)).

In yet another embodiment, the optical element is a passive component, which does not convert optical energy to another form and which does not change state (e.g., fiber, lens, add/drop filters, arrayed waveguide gratings (AWGs), GRIN lens, splitters/couplers, planar waveguides, or attenuators). In another embodiment, the optical element is a hybrid device which does not convert optical energy to another form but which changes state in response to a control signal (e.g., switches, modulators, attenuators, and tunable filters). It should also be understood that the optical device may be a single discrete device or it may be assembled or integrated as an array of devices.

The foundation is a structural feature on the substrate configured to receive the optical element. The configuration of the foundation will naturally vary according to the optical element. For example, if the optical element is an optical conduit, such as a fiber, the foundation may be a groove etched into the planar surface, such as a v-groove, which is known to receive optical fibers and position them accurately along the x and y axes. If the optical element is a waveguide, the foundation may be an etched trench or similar structure in which a waveguide may be disposed. Alternatively, the foundation may be a structure, such as walls, deposited on the planar surface, using, for example, photolithography. In yet another embodiment, the foundation may be solder pads or other interconnect for an OED. Still other embodiments will be obvious to one of skill in the art in light of this disclosure.

The OA package configuration disclosed herein facilitates manufacturability. For example, with reference to FIGS. 1-3, in one embodiment, the non-functional area of OED is etched to create the alignment element 113 which can be used for passive alignment as described above. This may be done preferably while the OED die is still in wafer form, using processes common in the chip manufacturing industry, which are capable of achieving very high accuracies. For example, all of the critical dimensions of the active portion and the alignment features can be masked in the same photolithography process. Likewise, this masking can be used to facilitate etching, or, deposition of a material such as a photo resist or other polymeric material that can be deposited on the substrate with a high degree of position.

The OED can then be placed sideways in the substrate in which the register surface is present (for instance a V-groove etched in silicon). In one embodiment, the OED is picked and placed by dedicated equipment and bonded in place by adhesive. The positioning in sideways and up/down direction (referring to the orientation in the figures) comes from the alignment features as described above.

Optionally, the electrical connection to the OED is made by dispensing a droplet of solder paste in the contact pad area, after which a reflow process creates the solder joint. The electrical connection can however also be made by other means, optionally involving other components, like for instance a PCB.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. An optical assembly having x, y and z axes and comprising:

a first substrate having a planar surface, a first wall adjacent and substantially perpendicular to said planar surface, a first register surface adjacent said first wall, at least one foundation to receive an optical element having a first optical axis at least partially along said z axis, wherein said foundation comprises a groove, wherein said first register surface comprises a portion of said groove adjacent said first wall;

said optical element having a periphery which contacts said groove to position said optical element in said groove, said periphery having a certain shape;

an opto-electrical device (OED) having a top surface, an active area on said top surface having a second optical axis normal to said top surface, and a first alignment element defined on said top surface, said OED abutting said first wall such that said first alignment element extends beyond said first wall and contacts said first register surface to position said OED on said first substrate along at least one of said x or y axes with said second optical axis parallel to said planar surface, wherein said first alignment element has a periphery having said certain shape such that said first alignment element is positioned in said groove along the x and y axes essentially the same as said optical element.

2. The optical assembly of claim 1, wherein said optical element is an optical conduit and said foundation is a groove extending from said first wall to an edge of said first substrate.

3. The optical assembly of claim 2, wherein said first register surface comprises at least a portion of said foundation.

4. The optical assembly of claim 3, wherein said optical conduit is a fiber.

5. The optical assembly of claim 4, wherein said optical assembly further comprises said fiber disposed in said foundation.

6. The optical assembly of claim 1, wherein said first substrate defines a second register surface adjacent said first wall, and said top surface comprises at least a second alignment element for contacting said second register surface to position said OED along said z axis.

7. The optical assembly of claim 6, wherein said second register surface is a portion of said first wall, and wherein said second alignment element is at least one surface on or adjacent said planar surface such that said at least one surface contacts said wall to position said OED along the z axis.

8. The optical assembly of claim 1, wherein said first substrate defines a cavity in which one side is defined by said first wall.

9. The optical assembly of claim 8, wherein said cavity is configured to receive said OED snugly such that at least one surface on or adjacent said top surface urges against said first wall.

10. The optical assembly of claim 8, wherein said cavity is configured to receive said OED with tolerance, and wherein said OED comprises at least one urging member on the opposite side of said top surface to urge said at least one surface against said first wall.

11. The optical assembly of claim 10, wherein said at least one urging member comprises a compliant material.

12. The optical assembly of claim 10, wherein said at least one urging member comprises a wedge-like member.

13. The optical assembly of claim 1, wherein said first alignment element is adjacent said active area on said top surface.

14. The optical assembly of claim 1, wherein said first alignment element protrudes from said top surface.

15. The optical assembly of claim 14, wherein said active area protrudes upward from said top surface, and said first alignment element is defined on an edge of said active area.

16. The optical assembly of claim 2, wherein said first alignment element protrudes from said top surface and seats in said groove to position said OED along said x and y axes.

17. The optical assembly of claim 16, wherein said certain shape is a semicircle.

* * * * *